United States Patent

Griffith

[11] Patent Number: 5,489,953
[45] Date of Patent: Feb. 6, 1996

[54] SIGHTING LENS FOR GOLFERS

[76] Inventor: Gregory A. Griffith, 6637 N. Midwest Blvd., Edmond, Okla. 73034

[21] Appl. No.: 354,019

[22] Filed: Dec. 6, 1994

Related U.S. Application Data

[63] Continuation-in-part of Ser. No. 313,800, Sep. 28, 1994, abandoned.

[51] Int. Cl.[6] ............................................. G02C 7/16
[52] U.S. Cl. ........................... 351/45; 351/158; 273/187.2
[58] Field of Search ............................. 351/41, 45, 158, 351/46; 273/35 R, 187.6, 190 R, 190 A, 187.2

[56] References Cited

U.S. PATENT DOCUMENTS

| | | | |
|---|---|---|---|
| D. 246,655 | 12/1977 | Van Horn et al. | D16/65 |
| 1,135,921 | 4/1915 | Ramsay | 2/433 |
| 2,009,700 | 4/1933 | McMurdo | 351/45 |
| 3,264,002 | 8/1966 | Palumbo | 273/183 |
| 3,268,228 | 9/1966 | Novack | 273/187.2 |
| 3,871,104 | 3/1975 | Underhill | 33/262 |
| 4,251,076 | 2/1981 | Krupicka | 351/45 X |
| 4,531,743 | 7/1985 | Lott | 273/183 B |
| 4,824,234 | 4/1989 | Sparks et al. | 351/158 |
| 4,991,849 | 2/1991 | Fabanich | 273/183 B |
| 5,177,510 | 1/1993 | Peters et al. | 351/45 |
| 5,305,027 | 4/1994 | Patterson | 351/44 |
| 5,335,182 | 10/1994 | Barbera | 351/45 |

*Primary Examiner*—William L. Sikes
*Assistant Examiner*—Huy Mai
*Attorney, Agent, or Firm*—Laubscher & Laubscher

[57] ABSTRACT

A sighting aid for golfers is characterized by a transparent lens having a sight line extending laterally across a surface thereof and a plurality of dots spaced along a line normal to the sight line. The dots are arranged adjacent to an edge of the lens beyond the focal path of the eye closest to the golfer's target. The dots are used by the golfer to spot a new target line for executing a golf shot for a breaking putt or for a fade or draw.

10 Claims, 2 Drawing Sheets

SIGHTING LENS FOR GOLFERS

This application is a continuation-in-part of application Ser. No. 08/313,800 filed Sep. 28, 1994, now abandoned.

BACKGROUND OF THE INVENTION

One of the biggest problems for golfers is properly aligning their swing, be it a full swing or a putting stroke, for a desired golf ball trajectory. The alignment difficulty results from a number of factors including the distance between the golfer's eyes and the ball, the distance between the target and the ball, and even the different orientation of the golfer's eye pupils. That is, most individuals have pupils that are not located at the same level in their head. This offset of the pupils typically distorts a target line extending across the golfer's body.

The present invention relates to an improved sight lens for golfers which enables the golfer to align his or her golf swing with the desired trajectory of a golf ball toward a target.

BRIEF DESCRIPTION OF THE PRIOR ART

Sighting aids for golfers are well known in the patented prior art as evidenced by the U.S. Pat. to Palumbo No. 3,264,002, Lott No. 4,531,743, Sparks et al No. 4,824,234, and Fabanich No. 4,991,849. In the Palumbo patent, for example, there is disclosed a golf putting alignment device which may be attached to or incorporated into a pair of spectacles. The device produces a visual representation of a line between the golf ball and the cup to assist the golfer in lining up a putt. The Patents to Lott, Sparks et al, and Fabanich also disclose devices for producing visual lines for assisting a golfer in aligning a golf shot.

While the prior devices normally operate satisfactorily, their usefulness is limited to situations where the golfer is attempting a straight putt or shot. Since most golf shots are of the draw or fade variety and most putts have a certain amount of break, a golfer rarely has the opportunity to play a straight shot.

The present invention was developed in order to overcome these and other drawbacks of the prior art by providing a golf alignment device which assists the golfer in aligning breaking putts and in producing the proper swing to achieve draw and fade golf shots.

SUMMARY OF INVENTION

Accordingly, it is a primary object of the present invention to provide a sighting aid for golfers including a lens which enables the golfer to view a golf ball, the lens having a combination of a sight line and dots for the golfer's use in aligning his golf swing. The sight line extends laterally across the lens in the golfer's field of vision and the dots are spaced along a line normal to the sight line adjacent a side edge of the lens. The dots are within the peripheral field of vision of the golfer but beyond the focal path of the eye of the golfer closest to a target. The golfer can align his swing relative to the sight line or to a line between the ball and one of the dots.

The line and dots can be etched into or painted onto a surface of the lens, or can comprise decals applied to the lens surface.

In a preferred embodiment, the lens has a concave configuration and includes mounting clips for mounting on a pair of spectacles or sunglasses. The mounting clips may include extensions if desired to space the lens from the golfer's head.

In an alternate embodiment, the lens comprises a pair of lenses mounted in an eyeglass frame. The sight line is provided on each lens, with the line extending co-linearly. The dots are provided on only one lens, i.e., the left lens for a right-handed golfer and the right lens for a left-handed golfer.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
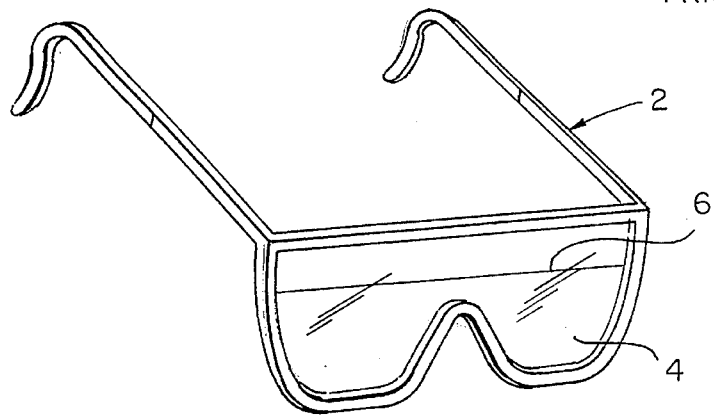
FIG. 1 is a perspective view of a golfer's sighting aid according to the prior art.

There is shown in FIG. 1 a golfer's sighting aid according to the prior art. It comprises spectacle frames 2 containing a transparent lens 4 having a horizontal sighting line 6 extending across the lens. The sighting line is used to align putts when worn by a golfer.

The present invention improves upon the prior device by providing a sighting aid for golfers which can be used to align putts with compensation for the break of the ball across an undulating putting green and to align golf shots to produce the appropriate swing for draw and fade shots. According to a preferred embodiment shown in FIG. 2, the sighting aid of the invention comprises a unitary lens 8 which preferably has a concave configuration. The lens is formed of any suitable transparent material such as shatterproof glass or synthetic plastic. Across the outer surface of the lens is provided a lateral sight line 10 which extends across the portions of the lens opposite the golfer's eyes. The portions of the sight lines opposite each eye are co-linear and preferably located below the horizontal centerline of the lens.

Figure 2:
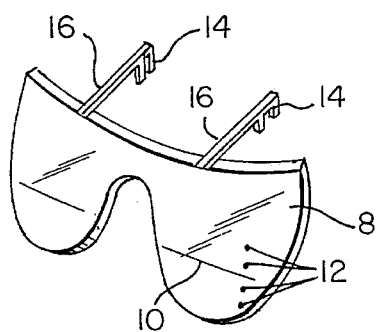
FIG. 2 is a perspective view of sighting lens according to a preferred embodiment of the invention.

The characterizing feature of the sighting aid according to the invention is the provision of a plurality of spaced dots 12 on the outer surface of the lens. The dots are preferably equally spaced along a line normal to the sight line and with an equal number of dots being provided above and below the sight line. The dots are provided beyond a focal path of an eye of the golfer adjacent a side edge of the lens. Furthermore, the dots are arranged on the side of lens closest to the target. For example, a right-hand swinging golfer stands with his left side in the direction of the target when the golfer addresses the ball to make a shot. Thus, the golfer's left eye is closer to the target than the right eye. The sighting aid shown in FIG. 2 is for a right-hand swinging golfer since the dots are beyond the focal path of the golfer's left eye. However, the dots, and oftentimes the target, are within the peripheral field of vision of a golfer who is looking at the ball during address prior to the golf swing. For a left-hand swinging golfer, the only difference in the sighting aid is that the dots are provided adjacent the right edge of the lens.

Clips 14 are provided on the lens to connect the lens with a pair of spectacles or sunglasses being worn by the golfer. For farsighted golfers, extensions 16 may be provided between the clips 14 and the lens 8 to space the sight line 10 and dots 12 from the golfer for better vision.

The sight line and dots may be applied to the lens surface in any suitable fashion. In a preferred embodiment, the line and dots are etched into the surface, such as by a laser beam, to produce precise and permanent markings on the lens. Alternatively, the lines and dots can be painted on the lens surface or printed on decals which are affixed to the lens surface.

Figure 3:
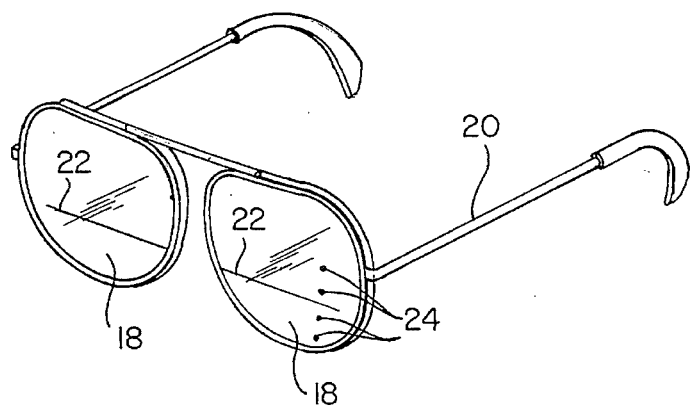
FIG. 3 is a perspective view of a sighting lens according to an alternate embodiment of the invention.

An alternate embodiment of the invention is shown in FIG. 3. In this embodiment, a pair of lenses 18 are mounted in an eyeglass frame 20. The sight line comprises co-linear lines 22 provided on both lenses and the dots 24 are applied on only one lens, again depending on whether the golfer swings from the right or left side.

Figure 4:
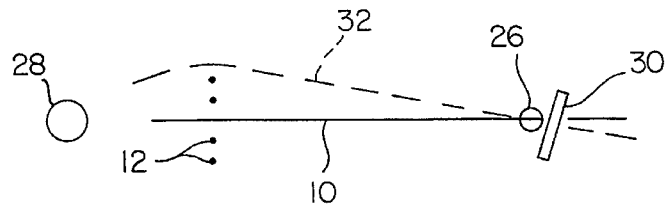
FIGS. 4 and 5 are schematic representations of the visual indication presented to a golfer for use in stroking putts which break to the left and right, respectively.
Figure 5:
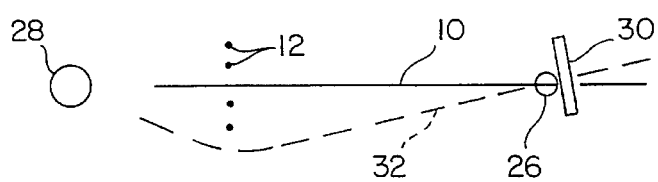

The use of the sight aid by a right-hand swinging golfer for executing a putting stroke will be described with reference to FIGS. 4 and 5. In both figures, there is shown the sight line 10, the dots 12, a golf ball 26, a target 28 such as the cup on a putting green and the blade 30 of a putter. In operation, the golfer address the ball and aligns the sight line directly on a line between the center of the ball and the center of the cup. For a straight putt, i.e., a putt across a flat portion of the putting green and having no break, the golfer moves the putter blade 30 back along the target/sight line and then down the target line toward the cup. The blade strikes the ball which rolls along the target/sight line into the cup.

The dots 12 are used to align breaking putts across sloping portions of the green between the ball and cup. If a putt breaks right to left (FIG. 4), the golfer determines the amount of break and spots one of the dots above the sight line. For example, a slight break (i.e., one ball) would require spotting the target line at the first dot above the sight line. The greater the break, the higher the spotted dot. In the example shown in FIG. 4, the break is beyond the second dot. The target line 32 is set up between the ball and outside the second dot. The golfer then swings the putter and blade along the target line and the ball tracks the line and breaks toward the cup. In the example shown in FIG. 5, the set-up for a breaking putt from left to right is shown.

The same principles apply to execution of draw and fade shots. A draw is executed by swinging the club along the target line 32 shown in FIG. 4. Such a swing path is slightly "inside out" and produces a natural draw on the golf ball. A fade is executed by swinging the club head through an "outside in" swing path shown by the target line 32 of FIG. 5. For left-hand swinging golfers, the same principles apply with the dots and swing path being opposite those shown in FIGS. 4 and 5.

Figure 6:
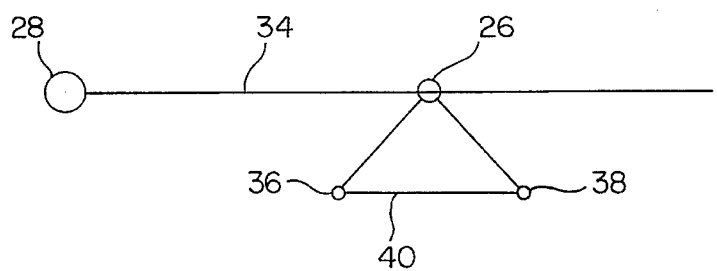
FIGS. 6, 7, and 8 are schematic representations of the sight lines for a golfer having even pupils, a lower left pupil, and a lower right pupil, respectively.
Figure 7:
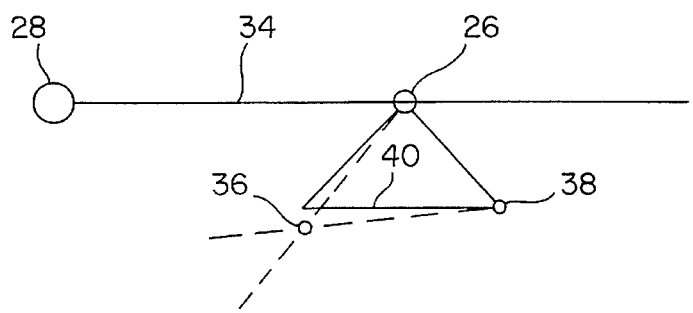
Figure 8:
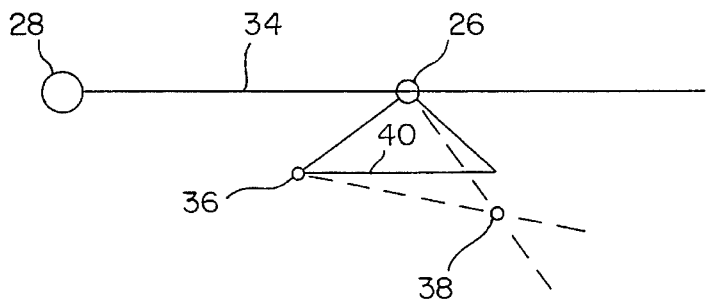

The basis for the operation of the sighting aid of the invention is best explained with an understanding of human physiology. It is known that very few people have eyeball pupils that are arranged exactly at the same level in the head. In FIGS. 6–8 are shown diagrammatically the target lines for right-hand swinging golfers with equal and offset pupils. More particularly, in FIG. 6, there is shown the target 28 and golf ball 26 and a direct target line 34 therebetween. Also shown are left 36 and right 38 pupils of a golfer, the pupils being arranged at an ideal equal level in the golfer's head. The line between the pupils is the direct pupil line 40 and it is parallel to the target line 34. Since these lines are parallel, there is little or no distortion perceived by the golfer in executing a putt along the sight line.

In FIG. 7, the left pupil 36 is lower than the right which creates a problem for the right-hand swinging golfer. His or her hands wants to go down the target line 34 but the pupil line 40 is pulling the hands and the shot to the left of the target line. To correct this problem, the golfer must pull in closer to the body the right pupil which brings the direct pupil line closer to parallel with the target line. The golfer can use this concept to set the plane of the swing to hit draw and fade golf shots. To pull the pupil line in, the golfer uses the neck muscles to reposition the head.

With a low right pupil 38 shown in FIG. 8, the golfer must pull the left pupil closer to the body to bring the pupil line 40 in parallel with the target line 34.

The sighting aid of the invention allows a golfer to line up his or her pupils and thus the pupil line as close to parallel to the target line which then maximizes the hand/pupil coordination necessary to execute a correct golf shot.

The curvature of the lens 8 in the embodiment of FIG. 2 is necessary because in addressing a golf ball, the golfer should rotate his or her pupil line on an axis which is through the top of the head and the spine in a rotational plane that is parallel to the target line. Thus, the pupil line is rolled in parallel to the target line during the swing.

In hitting a draw, the golfer sets up the pupil line parallel to the target line and then spots the dot that is just above the line for a small amount of draw and the ground. The golfer then sets the pupil line from the ball to the spotted dot and resets his or her body to the new pupil line while keeping the club face perpendicular to the direct target line. This effectively closes the club face in relation to the new pupil line. As the club is swung through the swing plane, the club face strikes the ball and imparts right to left spin on the ball resulting in a draw shot that starts right and moves back to the left. More draw is achieved by spotting the second dot above the line. Fade shots are achieved by spotting dots below the line.

The sighting aid has been described for use by golfers. However, the same principles apply to any athletic endeavor requiring a swinging motion. Thus, the sighting aid can also be used by a baseball batter, a tennis player, or the like to increase his or her performance.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. A sighting aid for golfers, comprising
   lens means for enabling a golfer to view a golf ball, said lens means including
   (1) a lateral sight line extending across the lens means in the golfer's field of vision; and
   (2) a plurality of spaced dots arranged along a line normal to said sight line adjacent a side edge of said lens means beyond a focal path of an eye of the golfer closest to a target, whereby the golfer can align a golf swing relative to said sight line and to a line between the ball and a selected one of said dots.

2. A sighting aid as defined in claim 1, wherein said dots are equally spaced and an equal number of dots are arranged on opposite sides of said sight line.

3. A sighting aid as defined in claim 2, wherein said sight line is arranged below center on said lens means.

4. A sighting aid as defined in claim 3, wherein said line and said dots are etched into a surface of said lens means.

5. A sighting aid as defined in claim 3, wherein said line and said dots are painted onto a surface of said lens means.

6. A sighting aid as defined in claim 3, wherein said lens means has a concave configuration.

7. A sighting aid as defined in claim 6, and further comprising means for connecting said lens means with a pain of spectacles.

8. A sighting aid as defined in claim 7, wherein said connecting means include extensions for spacing said lens means from said pair of spectacles.

9. A sighting aid as defined in claim 3, and further comprising a spectacle frame, said lens means comprising a pair of lenses mounted in said spectacle frame.

10. A sighting aid as defined in claim 9, wherein said lenses each contain a lateral sight line, said sight lines being co-linear.

* * * * *